(12) United States Patent
Chiang

(10) Patent No.: US 11,903,369 B2
(45) Date of Patent: Feb. 20, 2024

(54) RAISED ADJUSTABLE PET DISH TRAY

(71) Applicant: Avery Chiang, Taichung (TW)

(72) Inventor: Avery Chiang, Taichung (TW)

(73) Assignee: Churon Production LLC, Dongguan (CN)

( * ) Notice: Subject to any disclaimer, the term of this patent is extended or adjusted under 35 U.S.C. 154(b) by 89 days.

(21) Appl. No.: 17/393,401

(22) Filed: Aug. 3, 2021

(65) Prior Publication Data

US 2022/0030828 A1 Feb. 3, 2022

Related U.S. Application Data

(60) Provisional application No. 63/060,247, filed on Aug. 3, 2020.

(51) Int. Cl.
*A01K 5/01* (2006.01)
*A01K 7/00* (2006.01)
*F16M 11/32* (2006.01)

(52) U.S. Cl.
CPC .............. *A01K 5/0114* (2013.01); *A01K 7/00* (2013.01); *F16M 11/32* (2013.01); *F16M 2200/028* (2013.01)

(58) Field of Classification Search
CPC .. A01K 5/0114; A01K 5/0121; A01K 5/0128; A01K 5/0135; A01K 5/0142; A01K 7/00; F16M 11/32; F16M 11/34; F16M 11/36; F16M 2200/028
See application file for complete search history.

(56) References Cited

U.S. PATENT DOCUMENTS

| | | | | |
|---|---|---|---|---|
| 4,658,759 | A | * | 4/1987 | Brown ................ A01K 5/0114 119/61.5 |
| 6,427,626 | B1 | * | 8/2002 | Quinlan .............. A01K 5/0128 119/51.01 |
| 7,341,019 | B1 | * | 3/2008 | Tsengas ................ A01K 7/005 119/61.5 |
| D787,135 | S | * | 5/2017 | Green .......................... D30/131 |
| 10,701,896 | B1 | * | 7/2020 | Tsengas ..................... A01K 7/00 |
| D962,558 | S | * | 8/2022 | Yang ............................ D30/131 |
| D975,370 | S | * | 1/2023 | Yang ............................ D30/129 |
| 2015/0308615 | A1 | * | 10/2015 | Neaves .................. A01K 1/035 248/124.1 |
| 2022/0240484 | A1 | * | 8/2022 | Dickson ............... F16M 11/041 |

* cited by examiner

*Primary Examiner* — Ebony E Evans

(57) ABSTRACT

The present invention is a pet dish tray having removable dishes and adjustable height. The tray has holes configured to accept dishes which may be removed for filling and cleaning. The length of the sides which support the tray is adjustable.

4 Claims, 6 Drawing Sheets

RAISED ADJUSTABLE PET DISH TRAY

CROSS-REFERENCE TO RELATED APPLICATIONS

This application claims priority to provisional application 63/060,247 filed on Aug. 3, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

Domesticated animals (pets) generally rely on their caretaker/owner for food, water, and other basic necessities. In the case of household pets, caretakers often place food and water in dishes to both ration food and water and make the food and water readily available to the pet. In order to contain spilled food and water, dishes may be placed on a tray having raised sides. Further, in certain cases, the height of the tray may be adjustable to place the tray at a level appropriate to the pet.

DESCRIPTION OF RELATED ART INCLUDING INFORMATION DISCLOSED UNDER 37 CFR 1.97 AND 37 CFR 1.98

Not Applicable

BRIEF SUMMARY OF THE INVENTION

The present invention is a pet dish tray having removable dishes and adjustable height. The tray has holes configured to accept dishes which may be removed for filling and cleaning. The length of the sides which support the tray is adjustable.

DETAILED DESCRIPTION OF THE INVENTION

Figure 1:
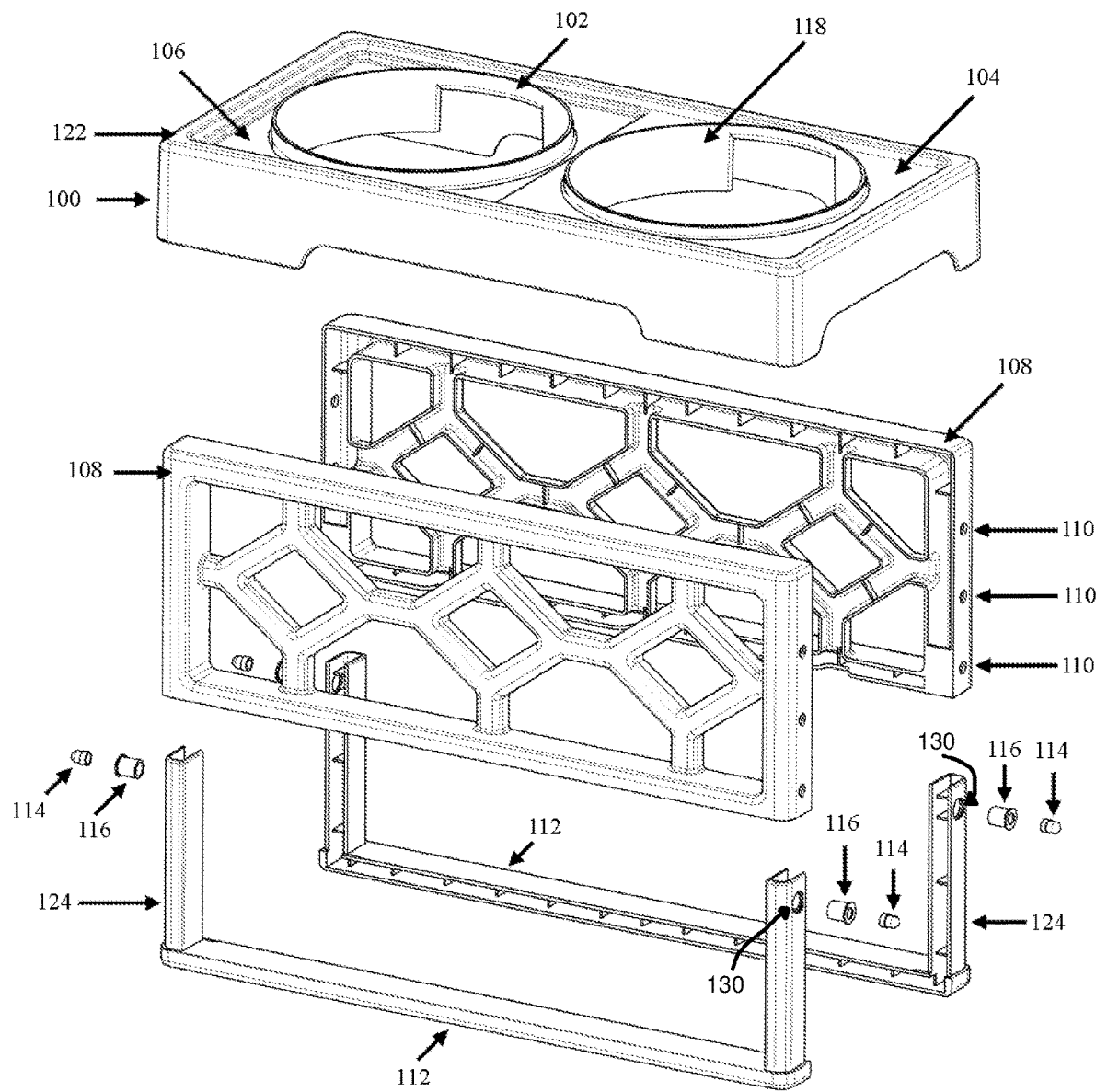
FIG. 1 is an exploded view of the apparatus of the present invention. Shown are the bowl holder tray, two upper leg portions, and two lower leg portions.
Figure 2:
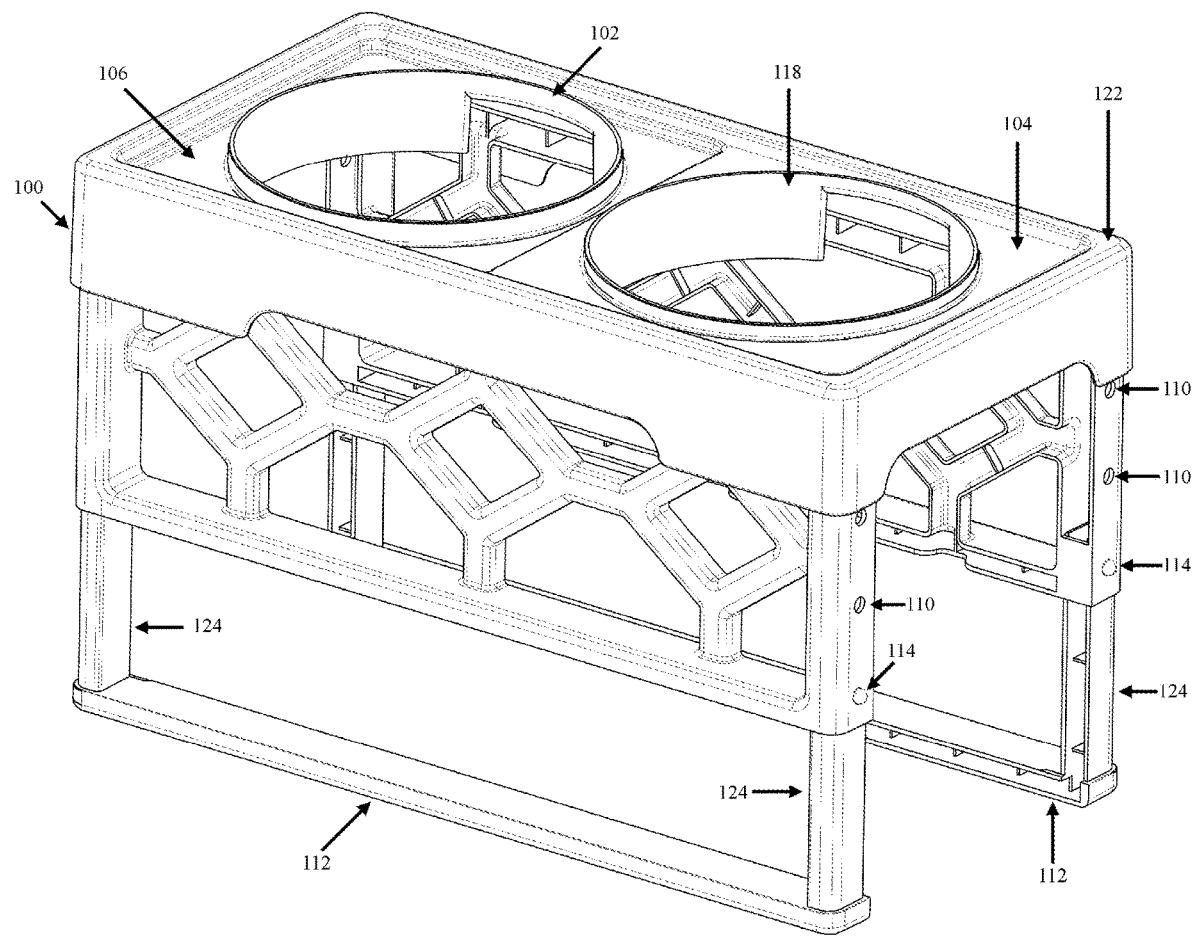
FIG. 2 is an assembled view of the apparatus of the present invention.
Figure 3:
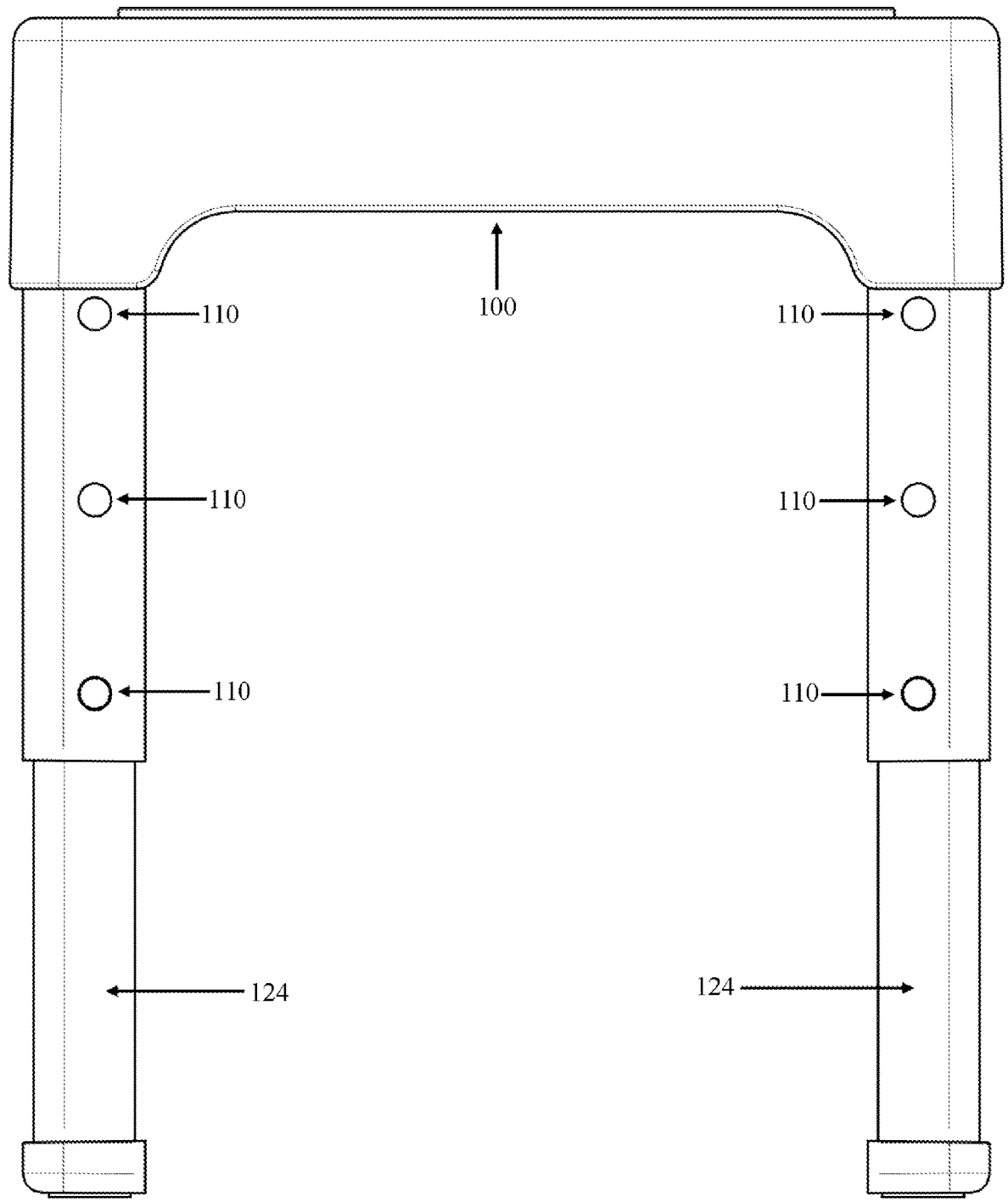
FIG. 3 is an end view of the apparatus of the present invention.
Figure 4:
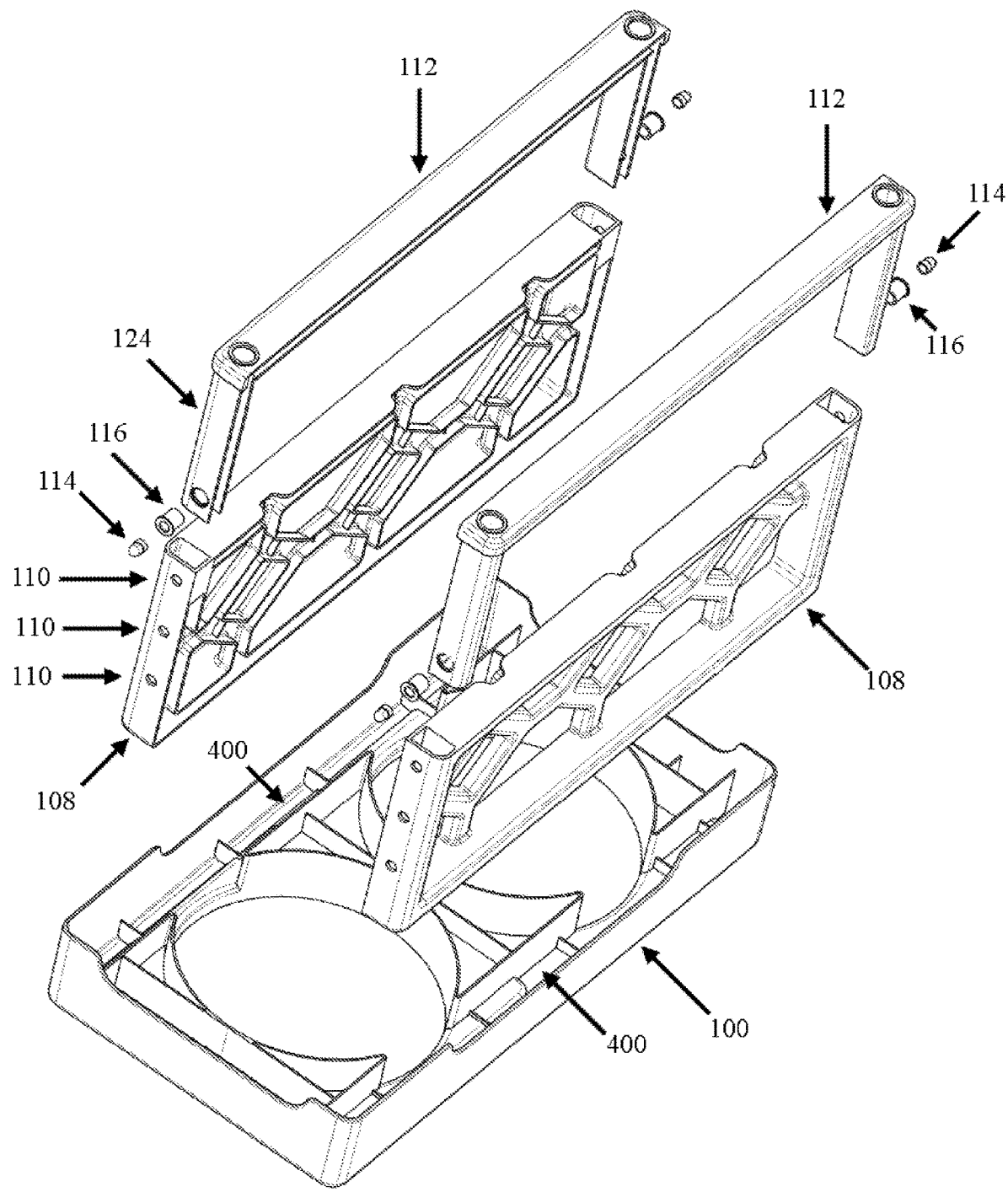
FIG. 4 is a bottom exploded view of the apparatus of the present invention.
Figure 5:
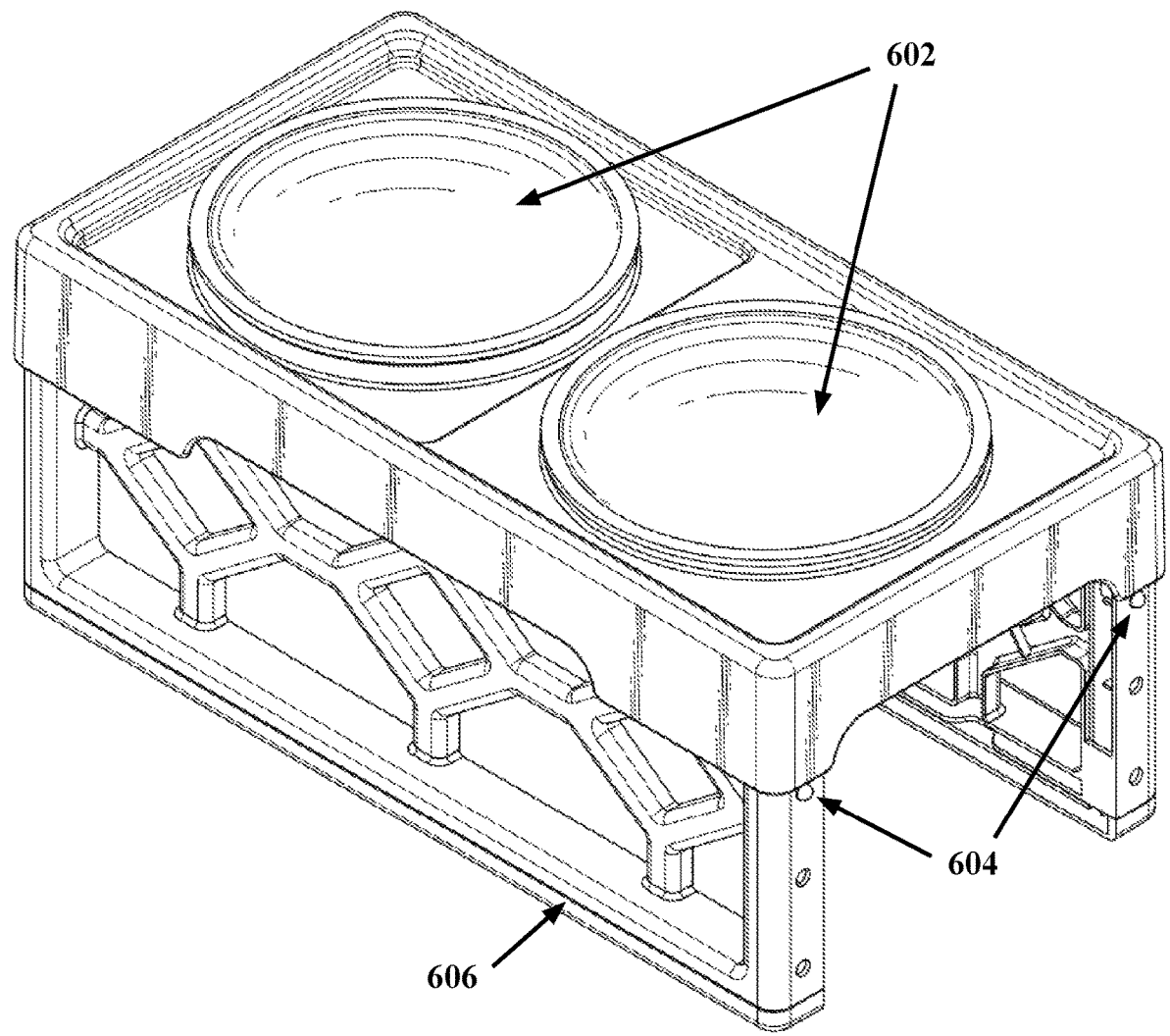
FIG. 5 is a perspective view of the apparatus of the present invention with two bowls inserted into the bowl holder tray.
Figure 6:
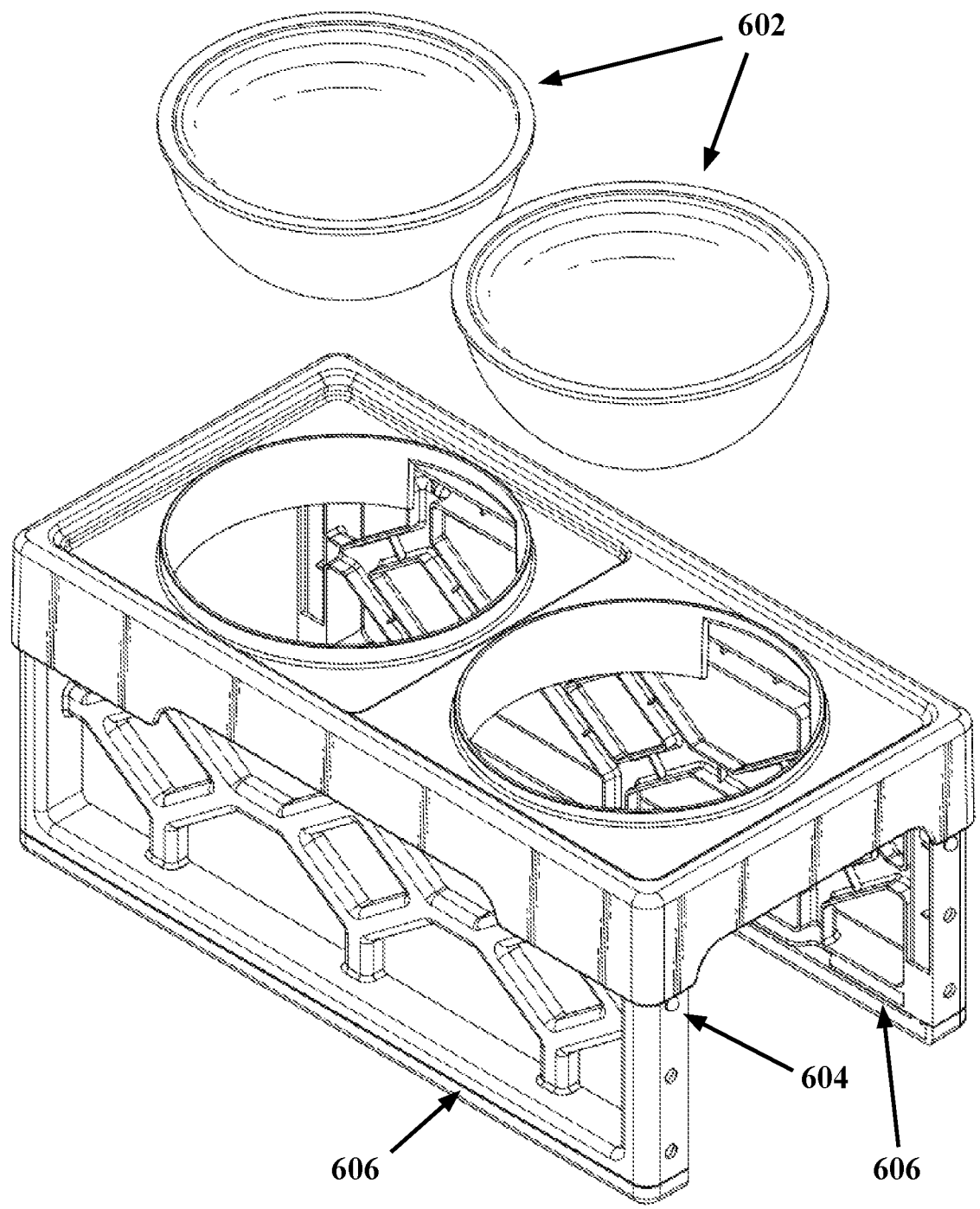
FIG. 6 is an exploded view thereof.

The present invention comprises three primary elements. The first element is a bowl tray 100. The second element(s) is/are side member(s) 108. The third element(s) is/are leg member(s) 112.

In a preferred embodiment, the bowl tray 100 is configured with a raised outer perimeter 122 to contain spilled liquids and solids. In an alternative embodiment, the outer perimeter of the bowl tray 100 is co-planar with the adjacent region of the bowl tray 100. In certain variations of this embodiment, the inside of the raised outer perimeter is rounded (radiused). The bowl tray is further preferably configured with a plurality of bowl containment features 102 and 118. In a preferred embodiment, the bowl containment features 102 and 118 comprise features configured to accept one or more removable bowls and substantially prevent the unintended displacement or removal of the bowls. In a preferred embodiment, the bowl containment features 102 and 118 are raised above the surface of the bowl tray 100. In an alternative embodiment, the bowl containment features 102 and 118 are coplanar the surface of the bowl tray 100. In yet another alternative embodiment, the bowl containment features 102 and 118 are recessed below the surface of the bowl tray 100. In a preferred variation of this embodiment, the bowl containment features comprise one or more openings through which the bottom of one or more bowls may be inserted and a perimeter of the openings 102 and 108 comprise features configured to center and/or resist rotation of a bowl placed in the containment features. In certain embodiments, the perimeter of the features 102 and 118 is comprised of flexible/pliable material, such as silicone, to aid in retaining a bowl 602 placed in the containment features 102 and 118. In an alternative embodiment, the bowl containment features 102 and 118 comprise one or more bowls 602 integral to the bowl tray 100.

The bowl tray 100 is preferably configured with side member retention features 400 configured to support and secure the bowl tray 100 to/on the side member(s) 108. In a preferred embodiment, the side member retention features 400 secure the side member(s) 108 detachably such that, once one or more side member(s) 108 are installed in said side member retention features, the side member(s) 108 may be non-destructively removed from the side member retention features 108 of the bowl tray 100. In a preferred embodiment, the side member retention features 400 comprise a plurality of cavities configured to fit around, and accept, features on an edge of the side member(s) configured to be the top of the side member(s) 108. In certain embodiments, the cavities are formed by protrusion(s) from the bowl tray 100 defining the perimeter of the cavity. In an alternative embodiment, the side member retention features comprise a plurality of protrusions configured to fit into one or more cavities on an edge of the side member(s) 108 configured to be the top of the side member(s) 108.

In a preferred embodiment, the side member(s) 108 are substantially flat. The edge(s) of the side member(s) 108 configured to be the top are preferably configured to cooperatively interface with side member retention features 400 of the bowl tray 100. In certain embodiments, the side member(s) 108 are configured with height adjustment features. In a preferred embodiment, the height adjustment features comprise a plurality of holes 110 spaced along the height of the side member(s) 108.

In one embodiment, the face of the side member(s) 108 configured to be installed opposite the bowl tray 100 is planar. In a preferred embodiment the face of the side member(s) 108 configured to be installed opposite the bowl tray 100 contains a plurality of depressions such that when the side member(s) 108 are installed in the leg member(s) 112 at their lowest height, space exists between a portion of the side member and the leg member.

In certain embodiment, the side member(s) 108 are substantially solid. In a preferred embodiment, the side member(s) 108 have a plurality of region(s) (cutout(s)) along a face of the side member 108 which has a reduced depth. These cutout(s) 102 allow a person to gab a leg member or a pet to climb the side member.

In a preferred embodiment, the leg member(s) 112 have vertical features 124. In a preferred embodiment, the leg members 112 are "U-shaped" with a plurality of vertical features 124 per leg. In a preferred embodiment, the vertical features 124 further comprise features configured to interface with height adjustment features 110 of the side member(s) 108. In a preferred embodiment, the features of the leg members configured to interface with height adjustment features of the side member(s) are projections 114 configured to enter one or more holes 110 in the side member(s) 108. In a preferred embodiment, projections 114 are biased into an interfering position with the side member(s) 108 by biasing members 116. In a preferred embodiment, the projections 114 and biasing members 116 are captured when the biasing member 116 is installed in the leg member 112, the projection 114 is installed in the biasing member 116, and the assembly (112, 116, and 114) is installed in the side member. In an alternate embodiment, removable and non-captured pegs are installed through one or more apertures 110 into an aperture in the leg member 112 to secure the bowl tray 100 at a desired height. In a preferred embodiment, the portion of the leg member 112 configured to accept biasing member 116 is a blind hole. In a preferred embodiment, the projections 114 are biased in an interfering position and the bias may be overcome by the application of force on the projections 114. By locating the projections 114 in height adjustment features 110 of the side member(s) 108 at various heights, the bowl tray 100 may be adjusted to various heights. In an alternative embodiment, the leg member 112 is configured with a through hole. In this alternative embodiment, features of the leg members 112 configured to interface with height adjustment features 110 of the side member(s) 108 are removable elements which pass through features of the side member(s) and leg member(s).

In certain embodiments, the leg member(s) 112 are configured with anti-skid features. In a preferred variation of this embodiment, the anti-skid features comprise cavities into which elastomer pads may be installed, and elastomer pads installed in the cavities, such that the pads extend beyond the opening of the cavities below the bottom of the leg member(s). In an alternative variation, the anti-skid features comprise elastomer pads installed on the bottom of the leg members such that the pads extend below the bottom of the leg member(s).

In certain embodiments, the leg member(s) 112 further comprise a plurality of rebated features 604 such that when the leg member(s) are installed on the side member(s) 108 at a minimum height, space 606 exists between at least a portion of the removable side member(s) 108 and the leg member(s) 112. In a preferred embodiment, the rebated features 604 are holes 130 in the leg member(s) 112 configured to receive the biasing members 116.

In a preferred embodiment, the invention is made substantially of injection-molded plastic. In alternative embodiments, the invention is made substantially of wood. A variety of other materials are anticipated and may be used without deviating from the present invention.

For purposes of this disclosure, including claims, plurality means one or more. Features disclosed on one element interfacing with a second element may also be reversed by installing them on the second element to interface with a first element without deviating from the present invention. Although the best known method of practicing the present invention is disclosed, the disclosure should be interpreted in its broadest, non-limiting nature.

SEQUENCE LISTING

Not Applicable

The invention claimed is:

1. An adjustable height pet feeding apparatus comprising:
a plurality of legs comprising:
movable pegs;
a plurality of removable sides comprising:
features configured to accept said plurality of legs;
a face configured with a plurality of apertures, configured to receive said pegs of said legs, located a plurality of distances from a bottom of said sides; and,
a bowl tray comprising:
a plurality of bowl holding features configured to accept a plurality of removable bowls,
a plurality of removable side attachment features configured to removably accept said plurality of removable sides, and,
a raised outer perimeter;
wherein said bowl tray further comprises a raised perimeter around one or more of said plurality of bowl holding features; and,
wherein a first portion of said bowl tray around a first set of bowl holding features configured to accept a first removable bowl and a second portion of said bowl tray around a second set of bowl holding features configured to accept a second removable bowl are not coplanar.

2. The adjustable height pet feeding apparatus of claim 1, wherein the first set of bowl holding features and the second set of bowl holding features are configured to hold the top portions of accepted removable bowls in said first and second sets of bowl holding features at different heights relative to a surface on which the adjustable height pet feeding apparatus is placed.

3. An adjustable height pet feeding apparatus comprising:
a plurality of legs comprising:
movable pegs;
a plurality of removable sides comprising:
features configured to accept said plurality of legs;
a face configured with a plurality of apertures, configured to receive said pegs of said legs, located a plurality of distances from a bottom of said sides; and,
a bowl tray comprising:
a plurality of bowl holding features configured to accept a plurality of removable bowls, a plurality of removable side attachment features configured to removably accept said plurality of removable sides, and,
a raised outer perimeter;
wherein the faces of said removable sides configured to be installed adjacent said legs further comprise a plurality of rebated features such that when said removable sides are installed on said legs at a minimum height, space exists between at least a portion of said removable sides and said legs.

4. An adjustable height pet feeding apparatus comprising:
a plurality of legs comprising:
movable;
a plurality of removable sides comprising:
features configured to accept said plurality of legs;
a face configured with a plurality of apertures, configured to receive said pegs of said legs, located a plurality of distances from a bottom of said sides, and,
a bowl tray comprising:
a plurality of bowl features defining bowls integral to said bowl tray;
a plurality of removable side attachment features configured to removably accept said plurality of removable sides, and,
a raised outer perimeter;
wherein the faces of said removable sides configured to be installed adjacent said legs further comprise a plurality of rebated features such that when said removable sides are installed on said legs at a minimum height space exists between at least a portion of said removable sides and said legs.

* * * * *